March 16, 1943.  B. BALLOU ET AL  2,314,066
FREESTONE PITTER
Filed March 16, 1942  3 Sheets-Sheet 1

LAWRENCE W. WATERS,
BENTON BALLOU,
INVENTORS

BY
ATTORNEY

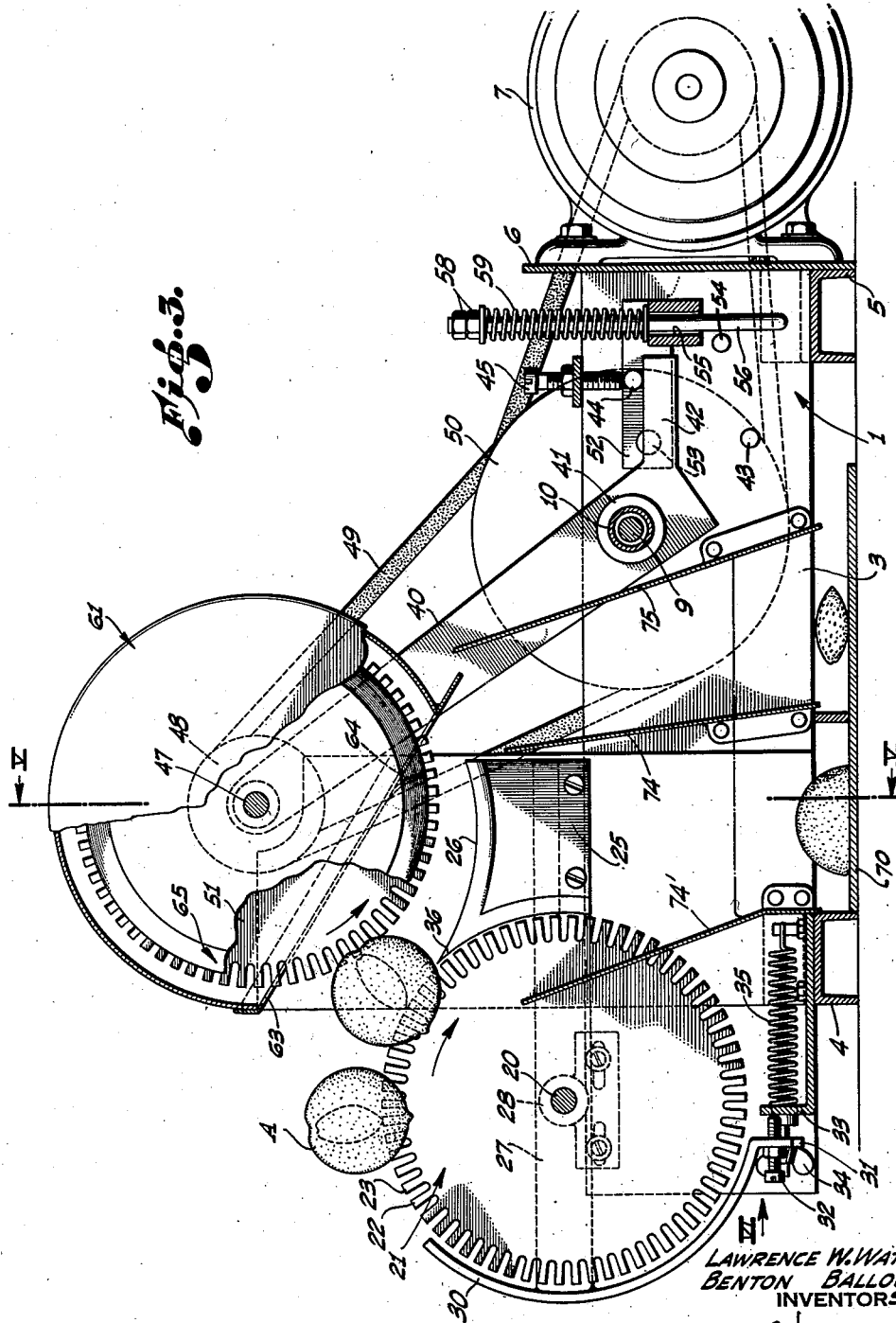

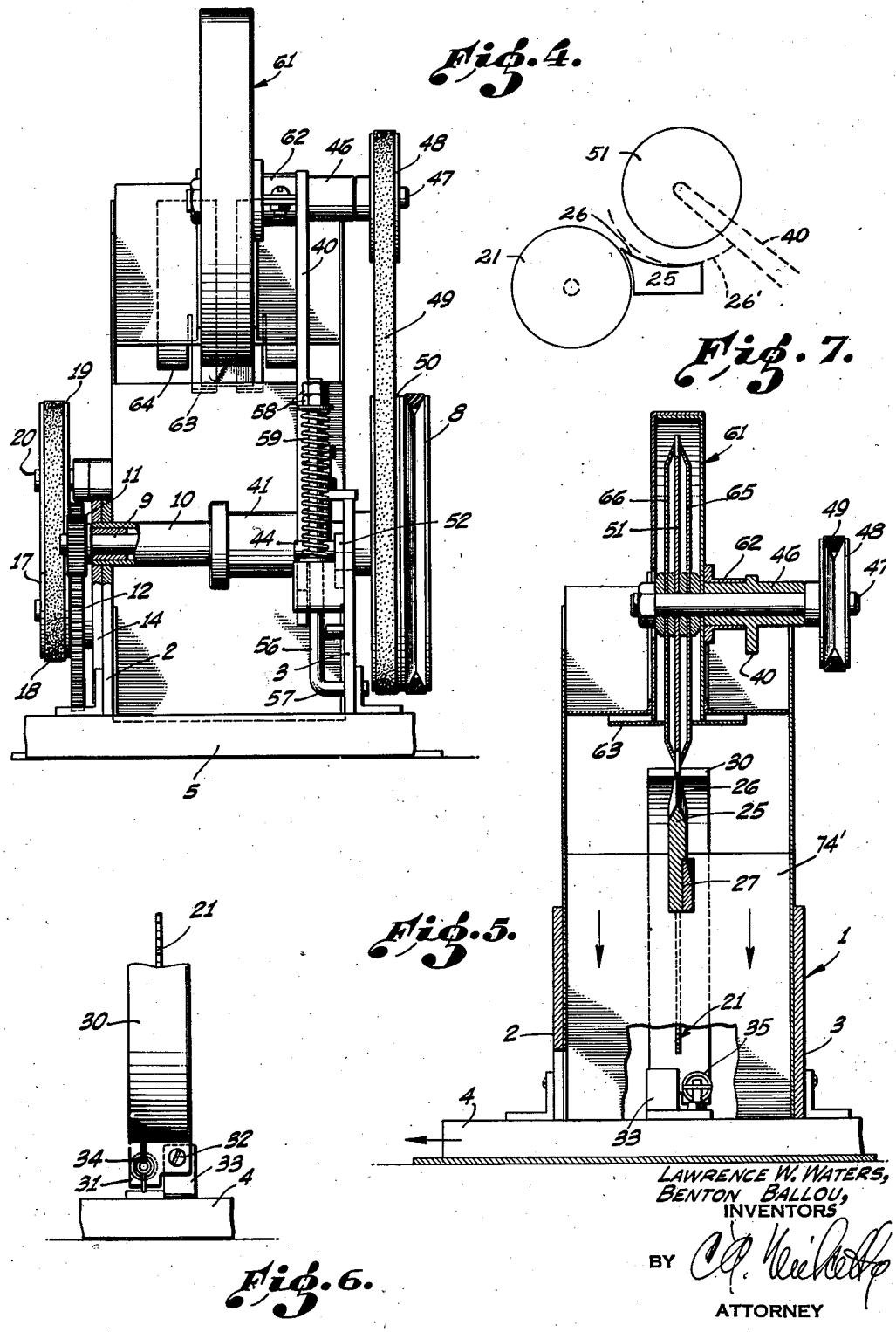

Patented Mar. 16, 1943

2,314,066

UNITED STATES PATENT OFFICE 2,314,066

FREESTONE PITTER

Benton Ballou and Lawrence W. Waters, Ontario, Calif.; said Waters assignor to said Ballou Application March 16, 1942, Serial No. 434,896

13 Claims. (Cl. 146—28)

The present invention pertains to a simple device for automatically pitting fruit in which the pit is readily separable from the flesh or meat of the fruit.

Fruit pitting machines have been designed and manufactured heretofore, but most of the machines are designed for use on fruit in which the pit is intimately associated with the flesh or meat, so that difficulty is experienced in separating the pit from the meat. Peaches of the cling variety are characterized by a tenacious bond between the pit and the meat. These prior automatic pitting machines are complex in structure and include various devices for timing the operation, for mechanically feeding the fruit through the machine and for using conveyors which grasp the fruit and move it through the cutting and pit-removing apparatus. Such conveyors have a tendency to bruise or disfigure the fruit. The device of the present invention is particularly well adapted for the handling of fruit in which the pit is readily separable from the meat, as for example, in the case of peaches of the freestone variety. Moreover, the invention distinguishes from prior devices in that timing devices, mechanical feeders, conveyors and the like are eliminated, and the fruit is handled from the pits instead of the outer surface, thereby reducing losses which are caused by bruising or damage to the flesh of the fruit. The apparatus of the present invention is further characterized by its ease of operation, portability and ease of adjustment, so that fruit of varying size may be readily passed through the machine without the necessity of sorting the fruit prior to pitting.

Generally stated, the device of the present invention contemplates the use of a feeding disc upon which the fruit is manually placed, the feeding disc then moving the fruit into position between a yieldable splitting blade and a pit-extracting disc. The pit of the fruit is grasped between the splitting blade and the extracting disc and the fruit is thus rotated in a desired plane, the meat being severed into two halves and the pit partly rotated within the fruit and ejected therefrom into a separate hopper or chute, thereby obviating the necessity of separating meats from pits as a subsequent operation. The apparatus of the present invention, moreover, utilizes the meat or flesh of the fruit as a means of holding the fruit in position and by reason of a yielding relationship between the splitting blade and pit-extracting disc, fruit of various sizes may be fed through the machine without individual adjustment.

It is an object of the present invention, therefore, to disclose and provide a relatively simple and inexpensive machine for pitting drupaceous fruit, particularly those varieties in which the pit is not tenaciously interlocked with the meat.

A further object of the present invention is to disclose and provide a fruit pitting machine in which the pit is grasped and rotated, in part at least, so as to free it from the meat and eject it from the fruit.

A still further object of the present invention is to disclose and provide a combination of elements whereby a fruit pitting machine of light weight is obtained, the machine being characterized by its ease of operation and adjustability. These and other objects and advantages of the present invention will become apparent to those skilled in the art from the following detailed description of an exemplary form of the invention.

In order to facilitate understanding, reference will be had to the appended drawings, in which:

Fig. 3 is a vertical section taken generally along the plane III—III of Fig. 2, certain parts being broken away.

Fig. 4 is an end view, with the motor and motor base plate removed.

Fig. 5 is a vertical transverse section taken along the plane V—V of Fig. 3, a part being broken away.

Fig. 6 is a partial end view of the guard and stop taken in the direction of the arrow VI of Fig. 3.

Fig. 7 is a diagrammatic section showing the relationship existing between some of the parts.

Figures 1, 2:
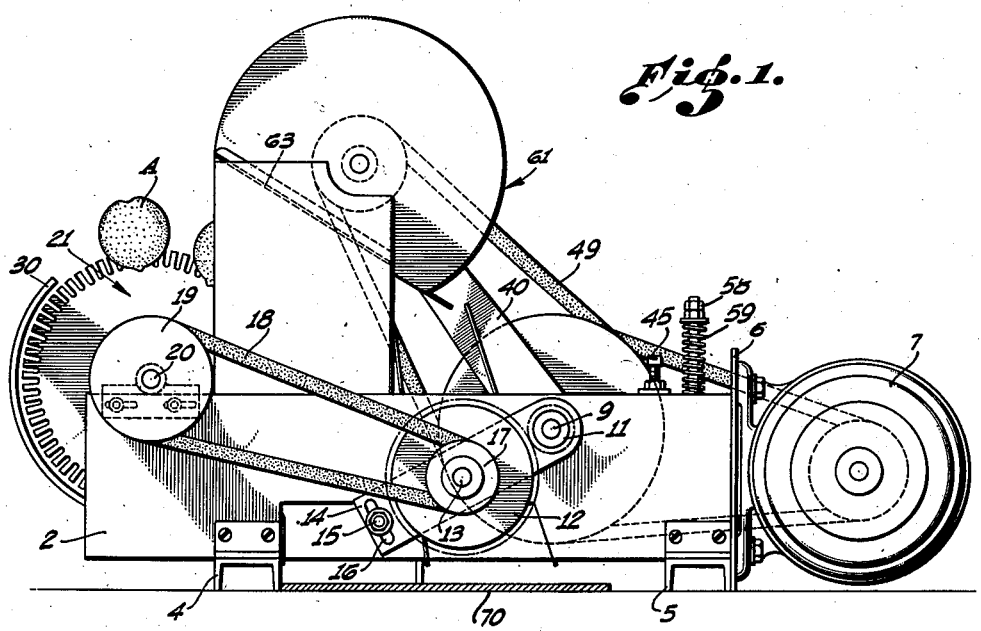
Fig. 1 is a side elevation.
Fig. 2 is a plan view.

As shown in these drawings, the frame 1 of the machine may comprise side members 2 and 3 mounted upon a suitable base, as for example, the cross members 4 and 5. The side members 2 and 3 may be held together by an end plate 6 to which is attached the motor 7. The motor 7 may be operably connected to a pulley 8 mounted upon a shaft 9 which is journaled within a hollow tubular housing 10 connecting the side members 2 and 3 of the frame. The shaft 9 also carries a pinion 11 in mesh with a large gear 12 which is journaled on a stud 13 carried by an arm 14, one end of which is clamped on the housing 10 and the other end attached to the frame as by means of an adjustment bolt 15 extending through an arcuate slot 16 formed in the arm 14.

Attached to the gear 12 is a small pulley 17 which is operable as by belt means 18 with a pulley 19 carried by a shaft 20 rotatably journaled in bearings adjustably mounted upon the side members 2 and 3 of the device. The shaft 20 carries the feeding disc 21. The feeding disc 21 is driven in the direction of the arrow at a relatively low speed and is provided with a plurality of spaced impaling elements, such as for example, the elements 22, 23 and the like which are carried by the periphery of the feeding disc. The impaling elements are spaced from each other, the spaces between the impaling elements being preferably at least two times the thickness of each element. A fruit placed upon the feeding disc into the position indicated at A will therefore be held by the feeding disc by reason of the undisrupted flesh tissue which extends through the spaces between the impaling elements. Each of the impaling elements, such as 23, is preferably of such width, and the space between the elements is sufficiently small that a plurality of impaling elements will extend into a single fruit simultaneously.

Fruit will be carried by the feeding disc 21 toward a splitting blade 25 which is closely adjacent the disc 21. The splitting blade 25 is preferably provided with a relatively sharp cutting edge 26, whereas the body of the blade is of appreciable thickness, the sides of the blade converging inwardly and upwardly to said edge 26. This splitting blade 25 is carried by an arm 27 which is pivoted upon the shaft 20. The arm 27 may, for example, be provided with a collar 28 through which the shaft 20 may rotatably extend. The arm 27 continues rearwardly and may be attached to a semicircular guard 30 provided with a downwardly and outwardly extending portion 31 having an adjustment screw 32 threadedly mounted therein, said adjustment screw bearing against a stop member 33 carried by the frame. The portion 31 may also be provided with a swivel-ended thumb screw 34 adjustably carried thereby, the swivel end of the thumb screw 34 being carried to a tension spring 35 attached to the frame. It will be evident that the spring 35 pulls the downwardly extending member 31 and the limit stop screw 32 into contact with the stop 33 so as to maintain the splitting blade 25 in proper raised position. Downward movement of the splitting blade is possible against pull of the spring 35 so that the splitting blade is yieldably urged upward. Since such splitting blade is pivoted on the shaft 20, the point 36 of the blade 25 is always maintained in close proximity to the edge of the feeding disc 21.

Pivotally mounted on the hollow tubular member 10 which extends between side members 2 and 3 is an arm 40 attached to a sleeve 41. The arm 40 is provided with a stop arm 42 which is adapted to abut a fixed stop 43 carried by one of the side members and an adjustable stop 44 capable of being adjusted by means of the adjustment screw 45. The arm 40 may therefore swing between the limits established by the stationary pin 43 and the adjustable stop 44. At its upper end the arm 40 is provided with a sleeve bearing 46 in which a stud shaft 47 is journaled. The shaft 47 carries a pulley 48 which may be operably connected as by means of a belt 49 with a pulley 50 mounted upon the shaft 9.

The stud shaft 47 also carries a pit-extracting disc 51 which may be similar in character and construction to the feeding disc 21. When the device is in operating position, the stud shaft 47 is preferably above the splitting blade 25 and in advance of the center of rotation of the feeding disc 21, the pit-extracting disc 51 being gravitationally urged downwardly toward the splitting blade 25.

In order to partly compensate for the weight of the arm 40, sleeve bearing 46, pit-extracting disc 51 and the like, the lower end of the arm 40 may be provided with counterbalancing means. Such counterbalancing means may comprise a member 52 pivotally connected to the side member 3 as at 53. The member 52 may carry stop pin 44 which bears down against stop arm 42. The member 52 may be provided with a boss having the bore 55 adapted to slidably receive a rod 56, the lower end of the rod being bent to form a horizontal portion 57 rotatable within the side member of the frame. The upper end of the rod 56 may be threaded and may be provided with locking nuts 58, a counterbalancing spring 59 bearing against the locking nuts and against the boss carried by member 52. Stop pin 54, fixed to side member 3, limits downward motion of member 52. The weight of the arm 40 and disc 51 will urge the disc 51 into operable relation with the feeding disc 21 (i. e., arm 40 is urged counterclockwise in Fig. 3 by gravity) but this movement is limited by adjustment screw 45 bearing against stop pin 44 and arm 42. Spring 59, however, carries some of the weight of arm 40 and disc 51 and tends to urge arm 40 in a clockwise direction so that as a result, the arm 40 is yieldably urged, by the partial counterbalanced action of gravity, toward the feeding disc and blade 25.

A suitable guard or housing, indicated at 61, may cover the upper portion of the pit-extracting disc 51, this housing 61 being attached as by means of a clamp 62 to the sleeve bearing or journal 46 carried by the arm 40. Lower portions of the guard 61 may be provided with outwardly extending shields 63. The angularity of the shields 63 may thus be varied by means of the clamp 62. The shields 63 may also be provided with a pair of downwardly extending fingers 64 adjacent the peripheral edge of the pit-extracting disc 51, the purpose of these fingers being described hereafter.

The pit-extracting disc 51 may carry spreader discs 65, 66, each of the spreader discs being provided with a beveled face terminating short of the periphery of the pit-extracting disc 51. These spreader discs have a tendency to separate the opening halves of a fruit being pitted.

The apparatus may be positioned above a split conveyor 70 (shown slightly higher with respect to the machine than in actual practice). A transverse partition 74 is provided adjacent the rear edge of the splitting blade 25, such partition cooperating with another partition 75 to form a chute for pits. A transverse partition 74' cooperates with partition 74 to direct halved fruit into the desired portion of conveyor 70.

In actual operation, the feeding disc 21 is driven at a relatively low speed by the motor 7, this low speed being accomplished by the reduction gearing 11—12. The pit-extracting disc is preferably driven at a much higher rate of speed. As for example, when the feeding disc is driven at 15–20 R. P. M. the pit-extracting disc may be driven at 350–750 R. P. M.

The edge 26 of the splitting blade 25 is preferably curved with its radius of curvature somewhat greater than the radius of curvature of the disc 51. Immediately prior to operation, the edge 26 of the splitting blade and the edge of the pit-extracting disc 51 should be so arranged (by adjustment of the stop screw 32 and adjustment screw 45) as to easily receive the pit of the largest fruit to be handled. A progressively decreasing space will then separate the cutting edge of the blade and the edge of the pit-extracting disc 51, the minimum distance being somewhat less than the size of the smallest pit which may be encountered. As shown diagrammatically in Fig. 7, the edge 26 of blade 25 forms a reverse curve in relation to the periphery of feeding disc 21 and the edge of blade 25 may terminate in a zone where the edge is virtually tangential to a circle described from the axis of rotation of the pit-extracting disc 51, such circle being indicated at 26'.

By reason of its portability and self-contained character, the machine may be placed over conveyors adapted to carry away the pitted fruit or wherever it is desired to operate the machine. An operator manually places fruit upon the feeding disc 21 by pressing the fruit into the disc. Ordinarily the operator so places the fruit upon the disc that the suture or peripheral indentation extending from the stem end of the fruit lies in the plane of the feeding disc 21. The slow rotation and speed of the feeding disc enables fruit to be readily placed thereon. The feeding disc brings the fruit onto the splitting blade 25 and the upper part of the fruit comes in contact with the rapidly revolving pit-extracting disc 51. The pit-extracting disc cuts through the meat of the fruit and pinches the pit against the splitting blade 25. Since the splitting blade 25 is yieldably urged toward the pit-extracting disc 51 but does not move in the direction of travel of the fruit, the pit of the fruit is partly rotated within the fruit proper and the fruit itself is rolled against the curved edge 26 of the splitting blade, the fruit being thus cut in half, the halves sliding between partitions 74 and 74' while the pit is ejected from the end of the splitting blade past the partition 74 into the pit chute. The spreader discs 55 and 56 carried by the pit-extracting disc have a tendency to separate the two halves of the fruit. Similarly, the beveled sides of the splitting blade cooperate to separate the meat from the pit. The separation of the meat from the pit is further facilitated by the slanting, downwardly extending fingers 64 which not only facilitate the separation of the meat from the pit but prevent the meat from being carried into the pit chute.

It is to be noted that pits of irregular contour, such as elliptical pits, are maintained in contact with the pit-extracting disc inasmuch as the splitting blade 25 is yieldably urged upwardly against the pit-extracting disc 51 at all times. A positive grip upon the pit of the fruit is also effected by the fact that the pit-extracting disc is downwardly and gravitationally urged toward the splitting blade 25. Inasmuch as the splitting blade 25 is pivoted about the shaft 28, the point 36 enters the fruit without any difficulty, irrespective of the rapidity with which the fruit is fed into the machine.

Attention is also called to the fact that the splitting blade 25 may be readily replaced when desired by swinging the housing 61 and the upper end of arm 40 in a rearward direction so as to cause the member 42 to abut the stop 43. The splitting blade 25 may be removably attached to the arm 27 in any well known manner. The edge 26 of the splitting blade is preferably sharp, as previously stated, but it may, if desired, be provided with small or fine teeth adapted to grasp the pit.

It is to be noted that in most fruits the pit is not centrally located, the meat being thicker on one side than on the other. Machines which employ clamps or holders move the fruit into position with the side surfaces of the fruit equally spaced with respect to the fruit splitting device and as a result, the fruit is not equally split, most of the pit cavity being found in one of the so-called halves. In contrast thereto, the mode of operation of the present machine requires that the operator feeding fruit to the machine, place the suture in the plane of the feeding and pit-extracting discs, and thereby places the pit centrally with respect to such discs, thus insuring that the halves have equal pit cavities. The pit-extracting disc grasps the pit (against the splitting blade) and the fruit-splitting operation is thus conducted and controlled from within the fruit and not from outside, as in prior machines. The pit is partly rotated (with respect to the flesh) and is actually moved out of the fruit, leaving the flesh of the fruit behind it, the forward movement of the pit itself acting to split and separate the halves of the fruit.

It will thus be seen that a simple, compact machine, employing a new mode of operation, has been devised and described. Those skilled in the art will readily appreciate that numerous minor changes in construction may be made without departing from the spirit of this invention and all changes coming within the scope of the appended claims are embraced thereby.

We claim:

1. In a machine for automatically pitting fruit in which the pit is readily separable from the meat, as in freestone peaches, apricots and the like, the combination of: a low speed feeding disc having a plurality of peripherally arranged impaling elements spaced from each other, the space between said elements being at least twice their thickness, said impaling elements being of the width and spacing adapted to cause a single fruit to be impaled by a plurality of said elements simultaneously and to retain undisrupted flesh tissue extending through spaces between said elements; a splitting blade adjacent said feeding disc and adapted to receive fruit therefrom, said splitting blade being provided with a concave cutting edge extending from adjacent the periphery of the feeding disc, said blade being pivoted about the center of rotation of the feeding disc; a pit-extracting disc journaled above the splitting blade; means for driving said pit-extracting disc and means for yieldably urging said blade toward said pit-extracting disc.

2. In a machine for automatically pitting fruit in which the pit is readily separable from the meat, as in freestone peaches, apricots and the like, the combination of: a low speed feeding disc having a plurality of peripherally arranged impaling elements spaced from each other, the space between said elements being at least twice their thickness, said impaling elements being of the width and spacing adapted to cause a single fruit to be impaled by a plurality of said elements simultaneously and to retain undisrupted flash tissue extending through spaces between said elements; a splitting blade adjacent said feeding disc and adapted to receive fruit therefrom, said splitting blade being provided with a concave cutting edge extending from adjacent the periphery of the feeding disc, said blade being pivoted about the center of rotation of the feeding disc; a pit-extracting disc journaled above the splitting blade; means for driving said pit-extracting disc; means for limiting the travel of said extracting disc toward and away from the splitting blade and gravity-actuated suspension means for yieldably urging said extracting disc toward said blade within said limits of travel.

3. In a machine for automatically pitting fruit, the combination of: a low speed feeding disc having a plurality of peripherally arranged impaling elements spaced from each other, said impaling elements being of a width and spacing adapted to cause a single fruit to be impaled by a plurality of said elements simultaneously and to retain undisrupted flesh tissue extending through spaces between said elements; a splitting blade adjacent said feeding disc and adapted to receive fruit therefrom, said splitting blade being provided with a concave cutting edge extending from adjacent the periphery of the feeding disc, said blade being pivoted about the center of rotation of the feeding disc; a pit-extracting disc rotatably journaled above the splitting blade; means for selectively adjusting the blade and pit-extracting disc relatively to each other and means for yieldably urging said blade toward said pit-extracting disc.

4. In a machine for automatically pitting fruit, the combination of: a low speed feeding disc having a plurality of peripherally arranged impaling elements spaced from each other, said impaling elements being of a width and spacing adapted to cause a single fruit to be impaled by a plurality of said elements simultaneously and to retain undisrupted flesh tissue extending through spaces between said elements; a splitting blade adjacent said feeding disc and adapted to receive fruit therefrom, said splitting blade being provided with a concave cutting edge extending from adjacent the periphery of the feeding disc, said blade being pivoted about the center of rotation of the feeding disc; a pit-extracting disc journaled in a pivoted arm yieldably supported above the splitting blade; means for driving said pit-extracting disc and means for yieldably urging the splitting blade toward the pit-extracting disc.

5. In the apparatus of the character defined in claim 4, the provision of a stop arm carried by the lower end of the pivoted arm and spring means cooperating with said stop arm for counterbalancing said pit-extracting disc.

6. In a machine for automatically pitting fruit, the combination of: a rotatable feeding disc having a plurality of peripherally arranged impaling elements, said elements being closely spaced to cause a single fruit to be impaled by a plurality of elements simultaneously; a lever pivoted about the center of rotation of the feeding discs; and a splitting blade carried by one end of said lever, said splitting blade being provided with a concave cutting edge extending in a gradual curve from a point adjacent the periphery of the feeding disc and forming a reverse curve with respect to a portion of such periphery.

7. In a machine for automatically pitting fruit, the combination of: a rotatable feeding disc having a plurality of peripherally arranged impaling elements, said elements being closely spaced to cause a single fruit to be impaled by a plurality of elements simultaneously; a lever pivoted about the center of rotation of the feeding disc; a splitting blade carried by one end of said lever, said splitting blade being provided with a concave cutting edge extending in a gradual curve from a point adjacent the periphery of the feeding disc and forming a reverse curve with respect to a portion of such periphery; a guard for the feeding disc carried by the other end of said lever, and means cooperating with a portion of the guard for resiliently loading said splitting blade.

8. In a machine for automatically pitting fruit, the combination of: a rotatable feeding disc having a plurality of peripherally arranged impaling elements, said elements being closely spaced to cause a single fruit to be impaled by a plurality of elements simultaneously; a rotatable pit-extracting disc in operable relation to the feeding disc, the distance between said feeding disc and pit-extracting disc being insufficient to grasp the pit of a fruit passing therebetween; and a splitting blade adjacent the feeding disc and provided with a curved cutting edge gradually approaching the edge of the pit-extracting disc from a point adjacent the edge of the feeding disc, said blade terminating at a zone where said edge is virtually tangential to a circle described from the axis of rotation of the pit-extracting disc whereby pits grasped between said splitting blade and pit-extracting disc may be ejected by the pit-extracting disc to beyond the end of said blade.

9. In a machine for automatically pitting fruit, the combination of: a rotatable feeding disc having a plurality of peripherally arranged impaling elements, said elements being closely spaced to cause a single fruit to be impaled by a plurality of elements simultaneously; a rotatable pit-extracting disc in operable relation to the feeding disc, the distance between said feeding disc and pit-extracting disc being insufficient to grasp the pit of a fruit passing therebetween; a splitting blade provided with a concave cutting edge extending in a gradual curve from a point adjacent the periphery of the feeding disc and forming a reverse curve with respect to a portion of the periphery thereof, said edge gradually approaching the edge of the pit-extracting disc, said blade terminating at a zone where said edge is virtually tangential to a circle described from the axis of rotation of the pit-extracting disc, whereby pits grasped between said splitting blade and pit-extracting disc may be ejected by the pit-extracting disc to beyond the end of said blade.

10. A machine of the character defined in claim 9 wherein said splitting blade is pivotally mounted about the center of rotation of the feeding disc, and including means for yieldably urging said blade toward said pit-extracting disc.

11. A machine of the character defined in claim 9 including a lever pivoted about the center of rotation of the feeding disc and carrying the splitting blade by one end thereof, a guard for the feeding disc carried by the other end of said lever, and means cooperating with a portion of the guard for resiliently loading said splitting blade.

12. In a machine for automatically pitting fruit, the combination of: a low speed rotatable feeding disc upon which fruit may be impaled; a lever pivoted about the center of rotation of the feeding disc, and a splitting blade carried by one end of the lever, said splitting blade being provided with a concave edge extending in a gradual curve from a point adjacent the periphery of the feeding disc and forming a reverse curve with respect to a portion of such periphery.

13. In a machine for automatically pitting fruit, the combination of: a low speed rotatable feeding disc upon which fruit may be impaled; a rotatable pit-extracting disc in operable relation to the feeding disc and in the same plane as such feeding disc; a pivoted arm in which said pit-extracting disc is journaled, gravity-actuated means for yieldably urging said arm and pit-extracting disc carried thereby into operable relation to the feeding disc; and a splitting blade positioned beneath said pit-extracting disc and adjacent the feeding disc, said splitting blade having a concave upper edge portion extending from a point adjacent the periphery of the feeding disc to beneath the pit-extracting disc, whereby the pit of a fruit fed onto the splitting blade may be grasped between the edge of the blade and the pit-extracting disc.

BENTON BALLOU.
LAWRENCE W. WATERS.